No. 782,629. PATENTED FEB. 14, 1905.
W. G. TEMPLETON.
CHEESE CUTTER.
APPLICATION FILED OCT. 14, 1903.
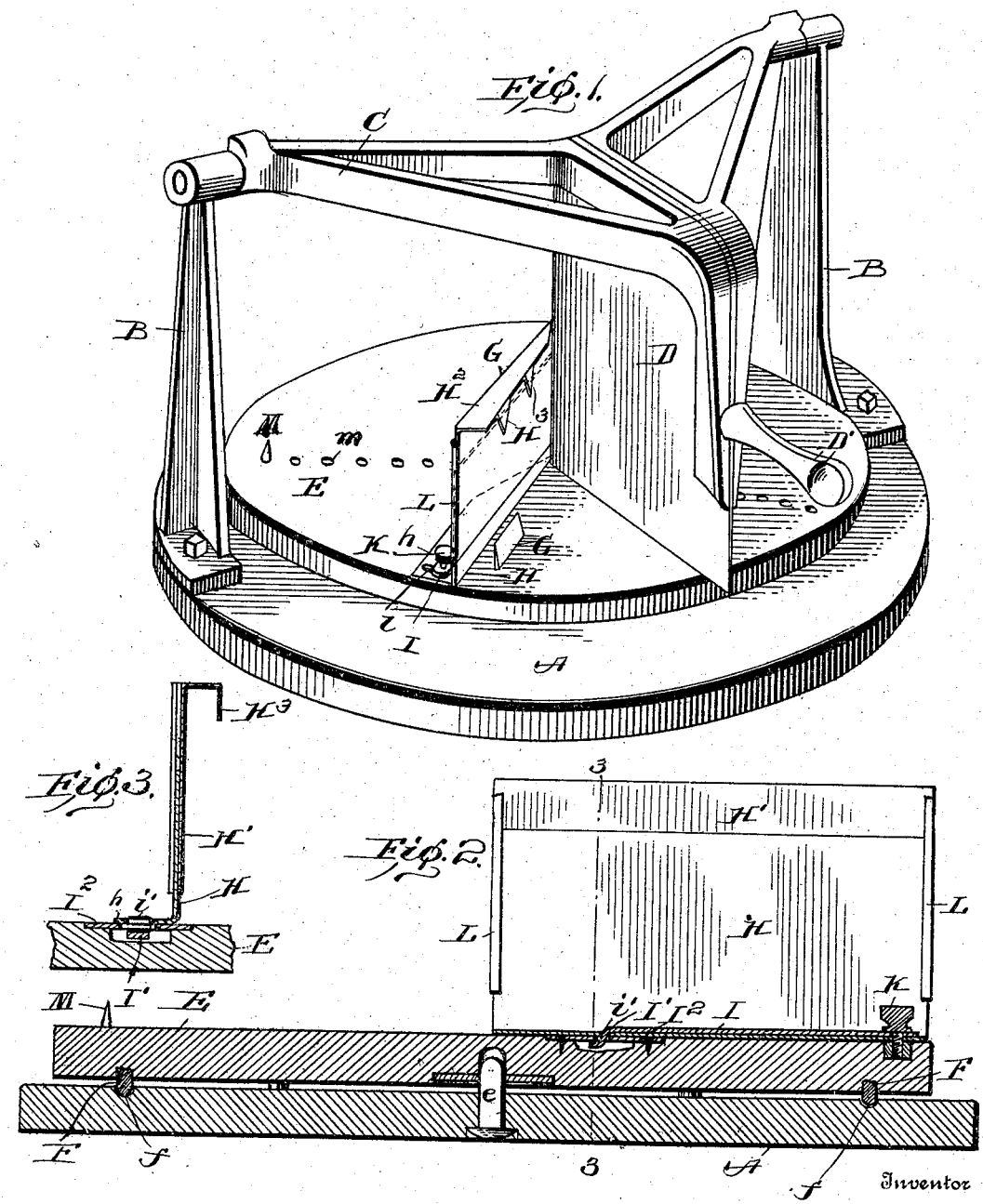

No. 782,629. Patented February 14, 1905.

UNITED STATES PATENT OFFICE.

WILLIAM G. TEMPLETON, OF COLORADO SPRINGS, COLORADO.

CHEESE-CUTTER.

SPECIFICATION forming part of Letters Patent No. 782,629, dated February 14, 1905.

Application filed October 14, 1903. Serial No. 177,029.

*To all whom it may concern:*

Be it known that I, WILLIAM G. TEMPLETON, of Colorado Springs, county of El Paso, State of Colorado, have invented certain new and useful Improvements in Cheese-Cutters; and I do hereby declare the following to be a full, clear, and exact description of the same, reference being had to the accompanying drawings, forming a part of this specification, and to the letters of reference marked thereon.

This invention relates to improvements in that class of apparatus designed for severing a cheese into segmental parts, the objects of the invention being to provide an improved means for holding the cheese for presentation to the cutting-knife, whereby not only will the complete severing of the segment from the body of the cheese be insured, but the cut face of the cheese itself will be effectually covered and protected and the final section of the cheese supported and held firmly in position during the cutting operation.

The invention consists in certain novel details of construction and combinations and arrangements of parts, all as will be now described, and pointed out particularly in the appended claims.

In the drawings, Figure 1 is a perspective view of a cheese-cutter embodying the present improvements. Fig. 2 is a vertical section taken through the base and bottom portion of the protecting and holding shield. Fig. 3 is a vertical section on the line 3 3 of Fig. 2.

Like letters of reference in the several figures indicate the same parts.

The face A of the cutter illustrated is shown as of conventional circular form with standards B rising therefrom and adapted to support the pivotal knife-carrier C, in which the cutting-blade D is mounted. The blade D constitutes the knife or cutter and is adapted to be raised and lowered with its pivotal support by a handle D'; but it will be understood that the base, cutter, and means for operating the cutter, as well as for moving the cheese the required distance, may be of any well-known or preferred type or construction, the form of these parts illustrated being, however, approximately similar to a well-known type of cheese-cutter now on the market and exemplified in my prior patent, No. 728,181, dated May 12, 1903.

The rotary table or cheese-support E is mounted on the base A, preferably on a central pivot $e$, and is adapted to be rotated by any suitable mechanical appliances, as is well understood in the art, or, as in the construction illustrated, by hand.

To prevent the table or cheese-support E from rotating too freely, as well as to provide a means whereby said table may be moved to a slight extent, so that its surface may conform precisely to the angle of the cutting edge of the knife, elastic supports, such as rubber buttons F, are interposed between the table E and base A or other part upon which the table E rests. In the preferred construction these elastic buttons F are mounted in the table E and rest in a groove $f$, constituting, as it were, friction-faces for retaining the table in its adjusted position, and at the same time permitting said table to be slightly depressed either parallel with the base or so as to occupy a slight inclination thereto, so as to cause the cutting edge of the knife to bear against the table with an even pressure throughout its entire length.

A cheese placed on the table E and properly centered is held in position, first, by a series of pins or projections in the table, and, secondly, by a protecting-shield H, which is removably and adjustably mounted on the table E, as will be now described. The series of pins lettered M in the drawings are removably mounted in the table, and a series of holes $m$ are located graduated distances from the center of the table for the reception of the pins. Thus a cheese having been centered the pins may be placed in the proper holes to retain the cheese in place.

It will be understood that when the first segment has been removed from the cheese one of the cut faces would be left exposed, while the opposite face would be protected by the cutting-blade D. When this first segment has been removed, the shield H is placed in position flat against the cut face of the cheese and is securely fastened, so that said cut face is protected. The preferred securing means for the shield H consists of a clamp which will permit the angular as well as the bodily position of the shield to be adjusted sufficiently to fit closely and accurately against the face of the cheese, and, as shown, this clamp coöperates with base-flange $h$ on the shield, which rests on the table in the space previously occupied by the segment first removed. The base-flange $h$ is provided at its outer end with a slot $i$ and at its inner end with a slot $i'$. The clamp I has its inner end I' bent to enter the slot $i'$ and pass down through a slot in the plate $I^2$ in the face of the table E and to engage said plate and clamp the flange $h$ down to the table, the outer end of the clamp being held down, as by the set-screw K, which passes through the slot $i$ and into the table. By forming the slots referred to of sufficient length the adjustment of the shield may be readily effected, and the clamp is of such character that when adjusted the shield will be held rigidly and securely in position without formation of corners and crevices for the accumulation of scraps and particles of cheese.

To accommodate and permit of the holding and protection of cheeses of differing thickness, the shield is preferably made adjustable in height, for which purpose it is provided with a sliding section H', usually held in place by the grooves or flanges L embracing the side edges of the body portion H, and this upper section H' is preferably made of relatively thin metal, so as to permit the cut face of the cheese to come squarely against both sections of the shield.

In order to hold the cheese firmly against the protecting and supporting shield, even though there remain but a very small segment to be cut, the adjustable section H' is provided with a top flange or projection $H^2$, and from the edge of this flange or section $H^2$ spuds or retaining projections $H^3$ extend downwardly in position to be forced into the top surface of the cheese. Thus in applying the shield the top section H' is raised and the shield adjusted against the cut face of the cheese. Then the top section H' is forced down until the spuds or retaining projections $H^3$ have entered the top of the cheese and the projection or flange $H^2$ rests squarely upon said surface.

The protecting and retaining shield is made relatively rigid, and thus serves as an anchor for retaining the cheese firmly in place and eliminates all danger of the final portion of the cheese being moved either accidentally or during the cutting operation, which result is particularly important where the cheese-cutter is designed for delivering definite quantities of cheese determined by its accurate subdivision into segments of proper thickness.

In the preferred construction a radial blade or projection G is arranged in the table E in proximity to the protecting and supporting shield, whereby it will occupy a position opposite to the downwardly-projecting spuds $H^3$ and form an additional retainer for preventing the lower portion of the final segment of the cheese from becoming displaced or moving away from the shield.

Having thus described my invention, what I claim as new, and desire to secure by Letters Patent, is—

1. In a cheese-cutter, the combination with the rotary table on which the cheese is mounted and a radially-arranged knife movable toward and from the table for severing the cheese into segmental sections, of the radially-arranged shield having a surface substantially coextensive with one of the cut faces of the cheese, means for removably anchoring the shield rigidly on the table and a retaining projection rigid on the table in proximity to the rear face of the shield and substantially parallel therewith to hold the final segment of the cheese in upright position against said shield; substantially as described.

2. In a cheese-cutter the combination with the rotary table on which the cheese is mounted and radially-arranged knife movable toward and from the table for severing the cheese into segmental sections, of the radially-arranged shield formed in two sections one adjustable vertically on the other to form a surface substantially coextensive in height with one of the cut faces of the cheese, means for removably anchoring the lower section rigidly on the table and a downwardly-extending projection carried by the upper part of the top section in position to enter the top of the cheese and retain the same firmly with its cut face against the shield and rigid with the table; substantially as described.

3. In a cheese-cutter the combination with the rotary table, radially-arranged knife movable toward and from the table for severing the cheese into segmental sections, and means for anchoring the cheese rigidly on the table, of a shield having a flat face substantially coextensive with one of the cut faces of the cheese and means connecting the upper part of the shield and cheese for anchoring the upper portion of the shield directly to the cut face of the cheese without moving the previously-anchored cheese on the table; substantially as described.

4. In a cheese-cutter the combination with the rotary table, radially-arranged knife movable toward and from the table for severing the cheese into segmental sections, and means for anchoring the cheese rigidly on the table, of a shield having a flat face adjustable to substantially coincide with the thickness of the cheese to cover one of the cut faces of the cheese and removably anchored rigidly to the table and means for separately anchoring the upper portion of the shield to the cheese; substantially as described.

5. A shield for the cut face of a cheese composed of two flat plates each of less width than the thickness of the cheese and slidably connected together to form a shield adjustable to the thickness of the cheese; substantially as described.

6. In a cheese-cutter, a cheese-support combined with a shield composed of two flat plates each of less width than the thickness of the cheese and slidably connected together to form a shield adjustable to the thickness of the cheese, means for anchoring the top plate to the cheese and means for removably anchoring the bottom plate rigidly to the cheese-support; substantially as described.

7. In a cheese-cutter the combination with a table on which the cheese is mounted and radially-arranged knife for severing the cheese into segmental sections, of a radially-arranged plate forming a shield for the cut face of the cheese and clamping fastening means for rigidly and adjustably connecting both ends of the plate with the table; substantially as described.

8. In a cheese-cutter, a follower formed of two flat plates slidably connected together, the upper one of said plates having a longitudinal top flange projecting on one side of the follower with anchoring projections thereon for entering the cheese and the lower one of said plates having a longitudinal bottom flange projecting on the opposite side of the follower for anchoring the follower in position; substantially as described.

9. In a cheese-cutter, the combination with the vertically-movable knife and rotary table, of a yielding support for said table whereby it may conform to the angle of the cutting edge of the knife; substantially as described.

10. In a cheese-cutter, the combination with the knife pivoted to swing vertically, of the table on which the cheese is mounted pivoted on a vertical axis to rotate horizontally, a base and elastic supports interposed between the table and base whereby the table may conform to the angular position of the cutting edge of the knife; substantially as described.

WILLIAM G. TEMPLETON.

Witnesses:
   THOMAS DURANT,
   ELIZABETH GRIFFITH.